United States Patent
Barger

(10) Patent No.: US 9,790,857 B2
(45) Date of Patent: Oct. 17, 2017

(54) MULTIPLE BEARING STACK RETENTION

(71) Applicant: UNITED TECHNOLOGIES CORPORATION, Farmington, CT (US)

(72) Inventor: David Barger, Vernon, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 244 days.

(21) Appl. No.: 14/597,830

(22) Filed: Jan. 15, 2015

(65) Prior Publication Data
US 2015/0300256 A1    Oct. 22, 2015

Related U.S. Application Data

(60) Provisional application No. 61/980,999, filed on Apr. 17, 2014.

(51) Int. Cl.
*F02C 7/06* (2006.01)
*F02C 7/36* (2006.01)
(Continued)

(52) U.S. Cl.
CPC ............... *F02C 7/06* (2013.01); *F01D 25/16* (2013.01); *F02C 7/36* (2013.01); *F16C 19/55* (2013.01); *F16C 2360/23* (2013.01)

(58) Field of Classification Search
CPC .... F01D 25/16; F02C 7/06; F02C 7/36; F16C 19/55; F16C 2360/23
See application file for complete search history.

(56) References Cited

U.S. PATENT DOCUMENTS 4,871,296 A * 10/1989 Laessle ............... F02C 7/277
                                                    192/56.61
5,042,963 A *  8/1991 Sorenson ............ F02C 7/268
                                                    415/123
(Continued)

FOREIGN PATENT DOCUMENTS

EP     0668450 A2    8/1995
FR     2882139 A1    8/2006
(Continued)

OTHER PUBLICATIONS

European Search Report for Application No. 15 16 4013 dated Oct. 14, 2015.
FR2882139 English Abstract, Aug. 18, 2006.
JPH09217740 English Abstract, Aug. 19, 1997.

*Primary Examiner* — Igor Kershteyn
(74) *Attorney, Agent, or Firm* — Cantor Colburn LLP

(57) ABSTRACT

An arrangement of concentric, independently rotating shafts for a rotating gear train system is disclosed. The arrangement may include an inner shaft, the inner shaft operatively couplet to a rotating element, and an outer shaft, the outer shaft concentric with the inner shaft and arranged radially outward from the inner shaft. The arrangement may further include a first bearing stack, the first bearing stack arranged radially outward from the inner shaft and including at least one preloaded ball bearing and a second bearing stack, the second bearing stack arranged radially outward from the outer shaft and comprising at least one ball bearing. The arrangement may include a bearing stack retainer, the bearing stack retainer mating with the first and second bearing stacks to hold the first and second bearing stacks in position with respect to the inner and outer shafts and the bearing stack retainer coupled with and rotating with the outer shaft.

20 Claims, 4 Drawing Sheets

(51) Int. Cl.
  *F16C 19/06* (2006.01)
  *F01D 25/16* (2006.01)
  *F16C 19/55* (2006.01)

(56) References Cited

U.S. PATENT DOCUMENTS

| | | | |
|---|---|---|---|
| 6,585,483 B2 * | 7/2003 | Feest | F02C 7/277 |
| | | | 415/122.1 |
| 6,708,482 B2 | 3/2004 | Seda | |
| 6,732,502 B2 * | 5/2004 | Seda | F01D 5/03 |
| | | | 60/226.1 |
| 7,547,185 B2 * | 6/2009 | Giesler | F01D 15/12 |
| | | | 184/11.1 |
| 8,083,030 B2 * | 12/2011 | Portlock | F01D 5/022 |
| | | | 184/6 |
| 8,511,986 B2 * | 8/2013 | Alvanos | F01D 25/16 |
| | | | 415/216.1 |
| 8,919,133 B2 * | 12/2014 | Bart | F01D 25/16 |
| | | | 415/229 |
| 2009/0249918 A1 | 10/2009 | Koyama | |

FOREIGN PATENT DOCUMENTS

| | | | | |
|---|---|---|---|---|
| JP | 409217740 A * | 8/1997 | | F16C 25/08 |
| JP | H09217740 A | 8/1997 | | |

* cited by examiner

MULTIPLE BEARING STACK RETENTION

CROSS REFERENCE TO RELATED APPLICATION

This application claims priority under 35 USC §119(e) to U.S. Provisional Patent Application Ser. No. 61/980,999 filed on Apr. 17, 2014.

TECHNICAL FIELD OF THE DISCLOSURE

The present disclosure relates to arrangements for concentric rotating shafts in a rotating gear train system, and more particularly, to an arrangement for concentric rotating shafts for a geared mechanism of a gas turbine engine.

BACKGROUND OF THE DISCLOSURE

Independently moving, concentric rotating shafts may be used as part of a rotating gear train system, such as a two-way clutch system. In such arrangements, bearings may be used as a means for maintaining concentricity of the rotating shafts. Ball bearings are often used in these arrangements when said arrangement is used in an aerospace engine, such as a gas turbine engine.

Gas turbine engines, such as those used to power modern commercial and military aircraft, may employ a two way rotating gear train system including two concentric rotating shafts arranged within the engine. The inner shaft may be in operative, rotating association with a rotating element of a fan section of the gas turbine engine, such as a gear of a gear box or the fan itself. For example, the engine may include a compressor section and a turbine section. The compressor section may include a low pressure compressor and a high pressure compressor and the turbine section may include a low pressure turbine and a high pressure turbine. The inner shaft of the gear train system may interconnect the low pressure compressor and the low pressure turbine while the outer shaft of the gear train system may interconnect the high pressure compressor and the high pressure turbine.

In such designs, the bearings within the stack of components for the concentric rotating shafts require robustness and operational longevity. To achieve such robustness, the engine designer may preload the ball bearings of the bearing stacks with a preload force. Generating preload can be accomplished using a variety of methods.

Further, without the presence of preload on a bearing stack, problems may arise, such as false brinelling on an inner bearing stack due to both shafts turning as a coupled pair. Therefore, solutions are needed to provide proper preload on the bearing stacks to ensure there is always a preload force on the bearings and to create allocation for proper flow of lubrication.

SUMMARY OF THE DISCLOSURE

In accordance with one aspect of the disclosure, an arrangement of concentric, independently rotating shafts for a rotating gear train system is disclosed. The arrangement may include an inner shaft, the inner shaft operatively couplet to a rotating element, and an outer shaft, the outer shaft concentric with the inner shaft and arranged radially outward from the inner shaft. The arrangement may further include a first bearing stack, the first bearing stack arranged radially outward from the inner shaft and including at least one preloaded ball bearing and a second bearing stack, the second bearing stack arranged radially outward from the outer shaft and comprising at least one ball bearing. The arrangement may include a bearing stack retainer, the bearing stack retainer mating with the first and second bearing stacks to hold the first and second bearing stacks in position with respect to the inner and outer shafts and the bearing stack retainer coupled with and rotating with the outer shaft.

In a refinement, the bearing stack retainer may include a retaining ring for holding the stack retainer in position with respect to the outer shaft.

In a refinement, the bearing stack retainer may define at least one castellation, the castellation designed to hold the stack retainer in position with respect to the outer shaft.

In a further refinement, the outer shaft may define at least one matching castellation, the at least one matching castellation designed to mate with the at least one castellation of the bearing stack retainer.

In a refinement, the bearing stack retainer may include an oil retaining dam.

In a refinement, the arrangement may further include a preload disc, the preload disc applying pressure to a race of the preloaded ball bearing of the first bearing stack.

In a refinement, the bearing stack retainer may apply pressure to a race of the ball bearing of the first bearing stack to provide pre-load for the first bearing stack.

In accordance with another aspect of the disclosure, a method for arranging concentric, independently rotating shafts for a rotating gear train system is disclosed. The method may include providing an inner shaft and operatively coupling the inner shaft to a rotating element. The method may further include arranging an outer shaft radially outward from the inner shaft, the outer shaft concentric with the inner shaft, arranging a first bearing stack radially outward from the inner shaft, the first bearing stack comprising at least one preloaded ball bearing, and arranging a second bearing stack radially outward from the outer shaft, the second bearing stack comprising at least one ball bearing. The method may include mating a bearing stack retainer with the first and second bearing stacks to hold the first and second bearing stacks in position with respect to the inner and outer shafts, the bearing stack retainer coupled with and rotating with the outer shaft.

In a refinement, the bearing stack retainer may define at least one castellation, the castellation designed to hold the stack retainer in position with respect to the outer shaft.

In a further refinement, the outer shaft may define at least one matching castellation, the at least one matching castellation designed to mate with the at least one castellation of the bearing stack retainer.

In a refinement, the method may further include providing an oil retaining dam using the bearing stack retainer.

In a refinement, the method may further include applying pressure for preload of the first bearing stack using a preload disc, the preload disc applying pressure to a race of the preloaded ball bearing of the first bearing stack.

In a refinement, the method may further include applying pressure for preload of the first bearing stack using the bearing stack retainer, the bearing stack retainer applying pressure to a race of the ball bearing of the first bearing stack.

In accordance with another aspect of the disclosure, a gas turbine engine is disclosed. The gas turbine engine may include a fan section, the fan section including a rotating element, a compressor section downstream of the fan section, a combustor section downstream of the compressor section, and a turbine section downstream of the combustor section. The gas turbine engine may include an inner shaft, the inner shaft operatively coupled to the rotating element of the fan section, an outer shaft, the outer shaft concentric with the inner shaft and arranged radially outward from the inner shaft, a first bearing stack, the first bearing stack arranged radially outward from the inner shaft and comprising at least one preloaded ball bearing, and a second bearing stack, the second bearing stack arranged radially outward from the outer shaft and comprising at least one ball bearing. The gas turbine engine may include a bearing stack retainer, the bearing stack retainer mating with the first and second bearing stacks to hold the first and second bearing stacks in position with respect to the inner and outer shafts and the bearing stack retainer coupled with and rotating with the outer shaft.

In a refinement, the compressor section may include a high pressure compressor and a low pressure compressor and the turbine section includes a low pressure turbine and a high pressure turbine.

In a further refinement, the inner shaft may interconnect to the low pressure compressor and the low pressure turbine and the outer shaft may interconnect to the high pressure compressor and the high pressure turbine.

In a refinement, the bearing stack retainer may define at least one castellation, the castellation designed to hold the stack retainer in position with respect to the outer shaft.

In a further refinement, the outer shaft may define at least one matching castellation, the at least one matching castellation designed to mate with the at least one castellation of the bearing stack retainer.

In a further refinement, the gas turbine engine may further include a preload disc, the preload disc applying pressure to a race of the preloaded ball bearing of the first bearing stack.

In a refinement, the bearing stack retainer may apply pressure to a race of the ball bearing of the first bearing stack to provide pre-load for the first bearing stack.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
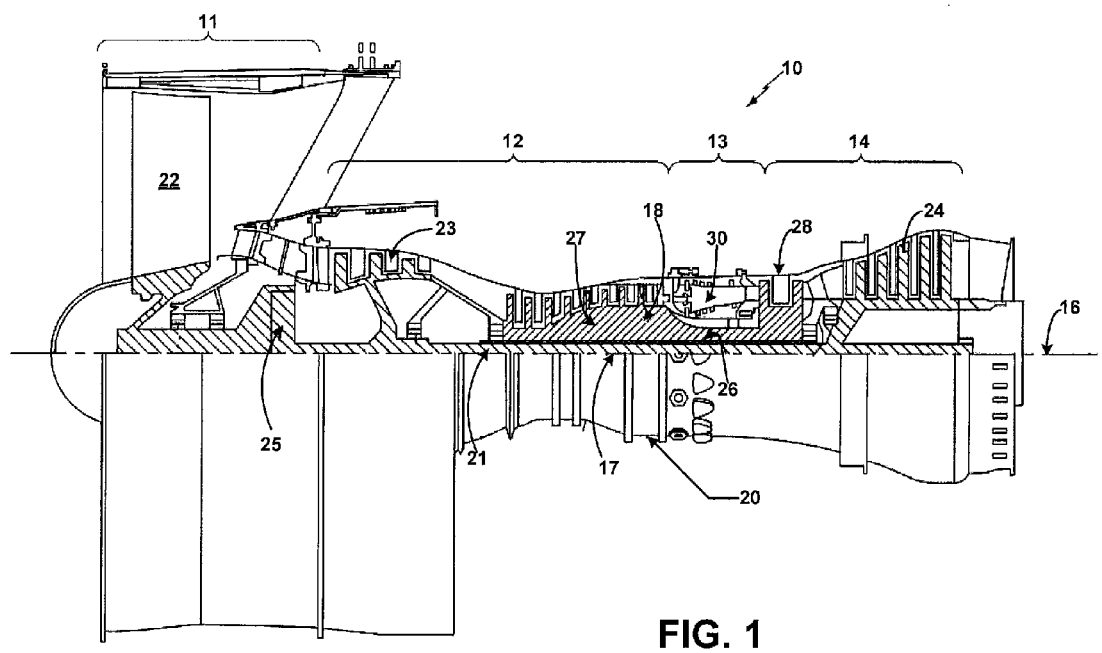
FIG. 1 is a cross-sectional view of a gas turbine engine constructed in accordance with the present disclosure.

Referring to the drawings, and with specific reference to FIG. 1, a gas turbine engine constructed in accordance with the present disclosure is generally referred to by reference numeral 10. Such a gas turbine engine 10 can be used for any number of different applications including, but not limited to, generation of aircraft thrust and land-based power. Moreover, it is to be understood that the sectional view provided in FIG. 1 is included simply to provide a basic understanding of the various sections in a gas turbine engine, and not to limit the invention thereto. The present disclosure extends to all types of gas turbine engines used in all types of applications.

The gas turbine engine 10 may have a fan section 11, the fan section 11 drawing in ambient air and directing the ambient air to a compressor section 12. The incoming air is greatly compressed by the compressor section 12 and directed to a combustor section 13 where it is mixed with fuel and combusted. The products of that combustion, in the form of very hot and expanding gases, are directed to a turbine section 14 shown to be downstream of the combustor section 13. The turbine section 14 and/or compressor section 12 may each be comprised of a plurality of blades radially extending from a shaft forming rotating sections or rotors. A plurality of vanes may radially extend inwardly from a static section or stator, and are intermeshed with the plurality of blades. In so doing, it can be seen that the turbine section 14, compressor section 12, and fan section 11 all revolve around a central engine axis 16.

Further, the gas turbine engine 10 may include a low spool 17 and a high spool 18 mounted for rotation about the central engine axis 16 relative to an engine case structure 20. The low spool 17 may include an inner shaft 21 that interconnects to a fan 22, a low pressure compressor 23 ("LPC") and a low pressure turbine 24 ("LPT"). The inner shaft 21 may drive the fan 22 directly or through a geared architecture 25 to drive the fan at a lower speed than the low spool 17. The high spool 18 may include an outer shaft 26 that interconnects a high pressure compressor 27 ("HPC") and high pressure turbine ("HPT") 28. A combustor 30 is arranged between the HPC 27 and the HPT 28. The inner shaft 21 and the outer shaft may be concentric and rotate about the central engine axis 16 which is collinear with their respective longitudinal axes.

Air within the gas turbine engine 10 may be compressed by the LPC 23 and/or the HPC 27. Said air may then be mixed with fuel and burned within the combustor 30 and then may be expanded throughout the HPT 28 and/or the LPT 24. The LPT 24 and/or the HPT 28 may rotationally drive the low spool 17 and the high spool 18, respectively, in response to the expansion of the fuel/air mixture.

Figure 2:
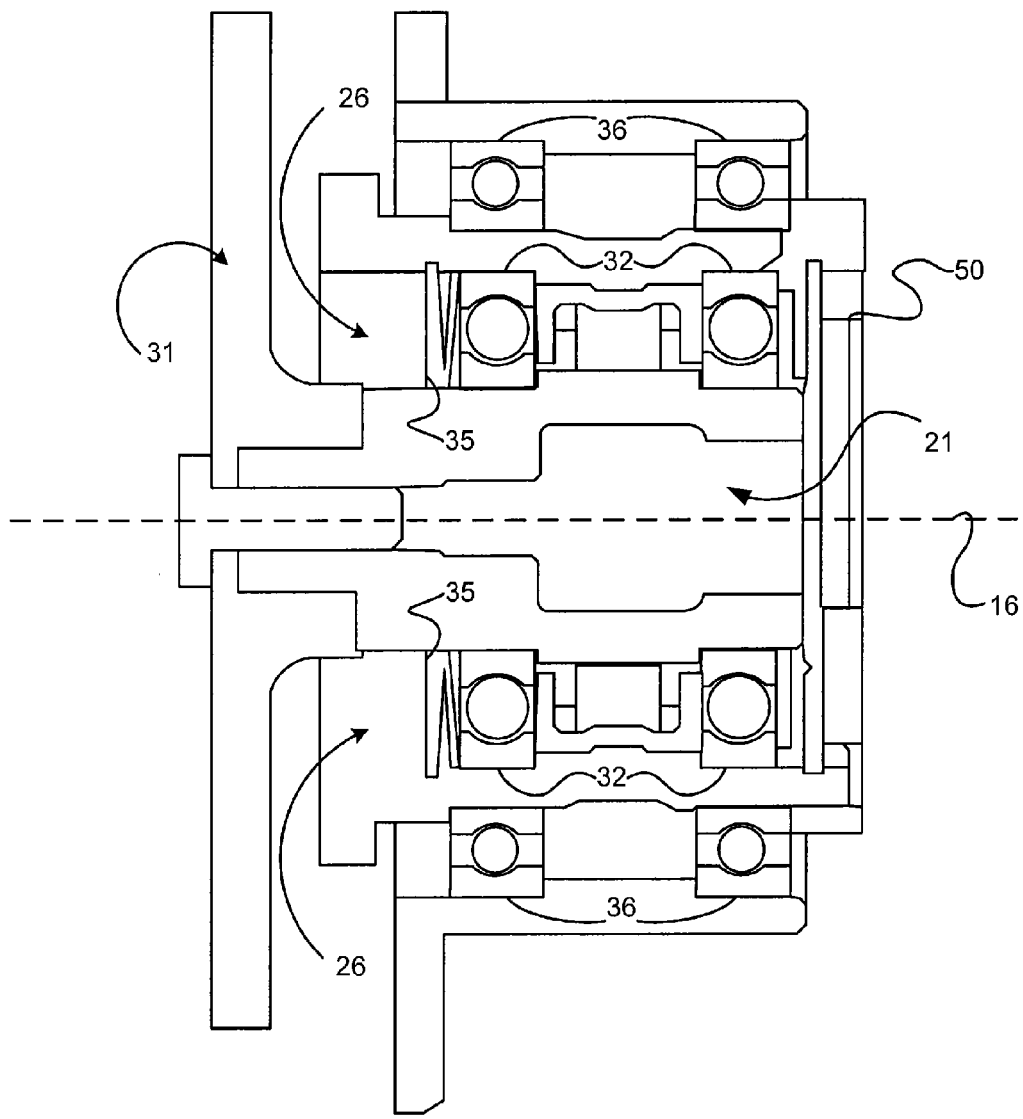
FIG. 2 is a cross-sectional view of an arrangement of concentric rotating shafts, the arrangement including a bearing stack held in place by a stack retainer, in accordance with the present disclosure.

The inner shaft 21 and the outer shaft 26 may be arranged as concentric, independently rotating shafts associated with a rotating gear element 31, rotating about the central engine axis 16, as shown in greater detail in FIG. 2. The rotating gear element may be, for example, a gear associated with the geared architecture 25. Alternatively, the rotating gear element may be another rotating element associated with the fan section 11, such as the fan itself. The inner shaft 21 is operatively coupled to the rotating element 31 and may drive the rotating element 31 in rotational motion.

Arranged radially outward from the inner shaft 21, the outer shaft 26 is concentric to the inner shaft 21 and may rotate independently from the inner shaft 21. An inner bearing stack 32 may be arranged radially outward from the inner shaft 21 yet radially inward with respect to the outer shaft 26. The inner bearing stack 32 may include one or more ball bearings for providing free, independent radial motion for both the inner shaft 21 and outer shaft 26. For lubrication purposes, the inner bearing stack 32 may distribute oil to associated ball bearings to ensure proper bearing motion and to increase life of the inner bearing stack 32.

Further, the arrangement of FIG. 2 may include an outer bearing stack 36 located radially outward of the outer shaft 26. The outer bearing stack 36 may include one or more ball bearings for providing free, independent radial motion of the outer shaft 26. The outer bearing stack 36 may also assist motion of other elements concentric with the arrangement. Additionally, the outer bearing stack 36 may distribute oil to associated bearings for ensuring proper motion and increasing life of the outer bearing stack 36.

The ball bearings of both the inner bearing stack 32 and the outer bearing stack 36 may be preloaded to set the bearings in proper axial position and to ensure the bearing stacks 32, 36 are properly held together throughout life of the arrangement. Bearing preload is related to the issue of ball bearing clearance and can be critical for the proper functioning of the bearing. A ball bearing will be fitted with a ball and a housing and will have some level of clearance therebetween, meaning there will be some give between the different parts of the bearing. To remove this internal clearance and create an interference fit, a preload force is applied. Preload is the process wherein a permanent thrust load is applied to the bearing, using force to push the bearing so that it is secure in an associated race and has no axial clearance.

The bearings associated with the inner bearing stack 32 and the outer bearing stack 36 may be preloaded to eliminate loose motion ("give") in both the radial and axial directions that exists even after the bearing is mounted, radially, on a shaft. When radial clearance exists, vibration and noise of the balls will occur, and the stiffness of the ball bearing will be very low. A force applied in the axial direction is the preload force. The preload force removes unwanted clearances, creates high stiffness, and reduces noise and vibration. Reducing clearances through preload may also help control the rotational accuracy of the bearing, reduce runout, and help prevent the balls in the bearing from skidding on the races.

Figure 3:
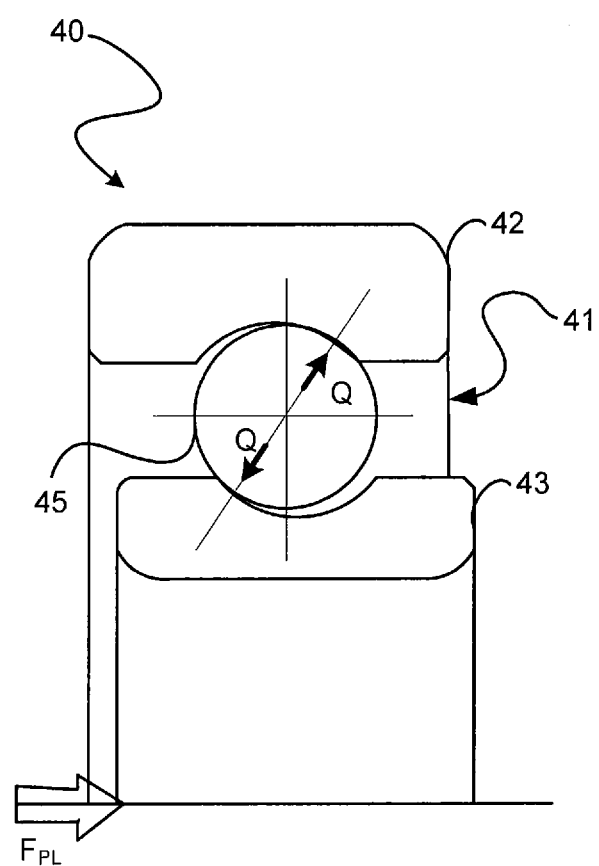
FIG. 3 is a schematic diagram of a bearing of the bearing stack of FIG. 2 showing pre-load forces applied to the bearing, in accordance with the present disclosure.

Turning now to FIG. 3, an example bearing 40 is shown having a raceway 41, including an upper race 42 and a lower race 43, and a ball 45 arranged therein. Optimum preload for the bearing 40 may be individually specified for the specific size of a ball 45 and is normally recommended after calculating the optimum operating surface stress at a contact ellipse of the bearing 40. The contact ellipse is the area of contact between the ball 45 and the raceway 41 that occurs as a result of elastic deformation of both parts under the load.

More specifically, the contact ellipse area (S) may be defined as an area between the ball 45 and the raceway 41 and defined as:

$$S = \pi a b$$

where a is the major axis of the contact ellipse area and b is the minor axis of the contact ellipse area. Operating surface stress may be given by Q/S, wherein Q is the ball 45 load or load on the raceway 41, said load Q being perpendicular to the area of contact. Operating surface contact stress may generally use the unit "MPa" (Kgf/mm$^2$).

Optimum preload may be calculated based on the optimum surface stress and applied as the force $F_{PL}$ to a member of the raceway 41. The preload force may be applied to bearings by mechanical means such as a solid preload using a mechanical means of locking the bearing and/or a spring preload which employs a spring to apply the preload force. In FIG. 2, a preload disc 35 is shown for applying preload force to a race of a bearing of the inner bearing stack 32. The preload disc 35 may employ any mechanical means and/or spring means to apply a force to the inner bearing stack 32 for preload.

Guidelines for preload may be based on noise life requirements for specific ball bearings. For example, in general applications with a noise life requirement between 5,000 and 10,000 hours, the optimum preload can be calculated using a contact ellipse stress that does not exceed 1000 MPa. The preload on a bearing may be optimized for various bearings and considering various characteristics of said bearings.

Figure 4:
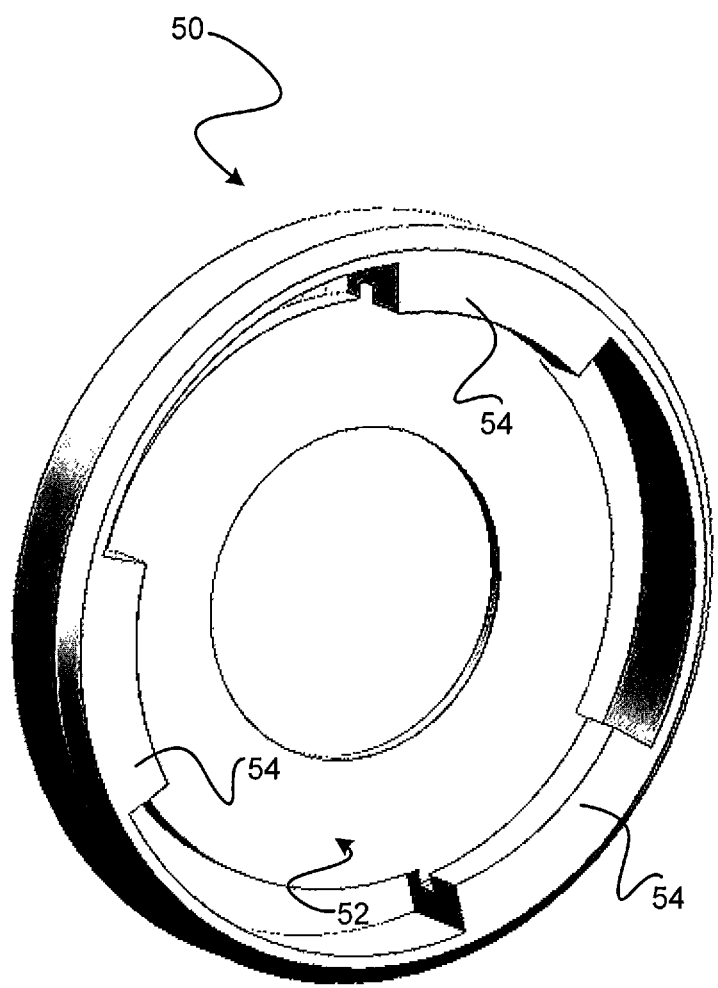
FIG. 4 is a perspective view of the stack retainer of FIG. 2, in accordance with the present disclosure.

Preload may also be maintained in an application to bearings using a bearing stack retainer 50, as seen in FIG. 2 and further detailed in FIG. 4. A bearing stack retainer 50 may be included to hold the bearing stacks 32, 36 for the concentric inner and outer shafts 21, 26. The bearing stack retainer 50 may mate with the first and second bearing stacks 32, 36 to hold them in position with respect to the inner and outer shafts 21, 26 and be coupled with and rotated with the outer shaft 26.

The bearing stack retainer 50 may be held in place using one or more castellations 54 defined by the structure of the bearing stack retainer 50. The castellations 54 may match with the outer shaft 26 and use features on the interior and/or exterior of the outer shaft 26 to allow the bearing stack retainer 50 to mate with the inner and outer bearing stacks 32, 36. The retainer will rotate with the outer shaft 36 and thus will always be in contact with the outer and inner rings of the bearings, mating to the inner and outer shafts 21, 26.

In some example designs for the bearing stack retainer 50, extra material may be used to form an oil dam 52 for the bearing stacks 32, 36. The oil dam 52 may prevent leakage of excess oil distributed to the bearing stacks 32, 36 and may aid in conserving oil throughout the stack arrangement.

The bearing stack retainer 50 may allow the ease of rotation for the arrangement by allowing the retainer to rotate with the shafts 21, 26 while securing said shafts 21, 26 and the associated bearing stacks 32, 36. Enabling rotation of the bearing stack retainer 50 aids in avoiding fretting in the bearings from improper contact. Such a bearing stack retainer 50 provides stack containment for preloaded bearings while allowing optimum rotation for all elements of the arrangement.

INDUSTRIAL APPLICABILITY

From the foregoing, it can be seen that the technology disclosed herein has industrial applicability in a variety of settings such as, but not limited to, arrangements for concentric, independently rotating shafts for rotating gear train systems. The rotating gear train systems may be associated with a gas turbine engine. The gas turbine engine may be used in conjunction with an aircraft for generating thrust, or for land-based applications for generating power. The teachings of the present disclosure may provide greater life of components by allowing preload to be maintained for greater life of the arrangement. Creating and maintaining preload on the bearings while using an associatively rotating bearing stack retainer allows proper motion of shafts and maintenance of preload. Because replacing a bearing stack, due to wear, may be costly and labor intensive, this improvement over the prior art may save costs due to the reduction in component replacement and repair costs/time.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. An arrangement of concentric, independently rotating shafts for a rotating gear train system, the arrangement comprising:
   an inner shaft, the inner shaft operatively coupled to a rotating element;
   an outer shaft, the outer shaft concentric with the inner shaft and arranged radially outward from the inner shaft;
   a first bearing stack, the first bearing stack arranged radially outward from the inner shaft and comprising at least one preloaded ball bearing;
   a second bearing stack, the second bearing stack arranged radially outward from the outer shaft and comprising at least one ball bearing; and
   a bearing stack retainer, mating with the first and second bearing stacks to hold the first and second bearing stacks in position with respect to the inner and outer shafts.

2. The arrangement of claim 1, wherein the bearing stack retainer comprises a retaining ring for holding the stack retainer in position with respect to the outer shaft.

3. The arrangement of claim 1, wherein the bearing stack retainer defines at least one castellation, the castellation designed to hold the stack retainer in position with respect to the outer shaft.

4. The arrangement of claim 3, wherein the outer shaft defines at least one matching castellation, the at least one matching castellation designed to mate with the at least one castellation of the bearing stack retainer.

5. The arrangement of claim 1, wherein the bearing stack retainer comprises an oil retaining dam.

6. The arrangement of claim 1, further comprising a preload disc, the preload disc applying pressure to a race of the preloaded ball bearing of the first bearing stack.

7. The arrangement of claim 1, wherein the bearing stack retainer applies pressure to a race of the ball bearing of the first bearing stack to provide pre-load for the first bearing stack.

8. A method for arranging concentric, independently rotating shafts for a rotating gear train system, the method comprising:
   providing an inner shaft;
   operatively coupling the inner shaft to a rotating element;
   arranging an outer shaft radially outward from the inner shaft, the outer shaft concentric with the inner shaft;
   arranging a first bearing stack radially outward from the inner shaft, the first bearing stack comprising at least one preloaded ball bearing;
   arranging a second bearing stack radially outward from the outer shaft, the second bearing stack comprising at least one ball bearing; and
   mating a bearing stack retainer with the first and second bearing stacks to hold the first and second bearing stacks in position with respect to the inner and outer shafts, the bearing stack retainer coupled with the outer shaft and rotating with the outer shaft.

9. The method of claim 8, wherein the bearing stack retainer defines at least one castellation, the castellation designed to hold the stack retainer in position with respect to the outer shaft.

10. The method of claim 9, wherein the outer shaft defines at least one matching castellation, the at least one matching castellation designed to mate with the at least one castellation of the bearing stack retainer.

11. The method of claim 8, the method further comprising providing an oil retaining dam using the bearing stack retainer.

12. The method of claim 8, further comprising applying pressure for preload of the first bearing stack using a preload disc, the preload disc applying pressure to a race of the preloaded ball bearing of the first bearing stack.

13. The method of claim 8, further comprising applying pressure for preload of the first bearing stack using the bearing stack retainer, the bearing stack retainer applying pressure to a race of the ball bearing of the first bearing stack.

14. A gas turbine engine comprising:
   a fan section, the fan section including a rotating element;
   a compressor section downstream of the fan section;
   a combustor section downstream of the compressor section;
   a turbine section downstream of the combustor section;
   an inner shaft, the inner shaft operatively coupled to the rotating element of the fan section;
   an outer shaft, the outer shaft concentric with the inner shaft and arranged radially outward from the inner shaft;
   a first bearing stack, the first bearing stack arranged radially outward from the inner shaft and comprising at least one preloaded ball bearing;
   a second bearing stack, the second bearing stack arranged radially outward from the outer shaft and comprising at least one ball bearing; and
   a bearing stack retainer, the bearing stack retainer mating with the first and second bearing stacks to hold the first and second bearing stacks in position with respect to the inner and outer shafts.

15. The gas turbine engine of claim 14, wherein the compressor section comprises a high pressure compressor and a low pressure compressor and the turbine section comprises a low pressure turbine and a high pressure turbine.

16. The gas turbine engine of claim 15, wherein the inner shaft interconnects to the low pressure compressor and the low pressure turbine and the outer shaft interconnects to the high pressure compressor and the high pressure turbine.

17. The gas turbine engine of claim 14, wherein the bearing stack retainer defines at least one castellation, the castellation designed to hold the stack retainer in position with respect to the outer shaft.

18. The arrangement of claim 17, wherein the outer shaft defines at least one matching castellation, the at least one matching castellation designed to mate with the at least one castellation of the bearing stack retainer.

19. The gas turbine engine of claim 14, further comprising a preload disc, the preload disc applying pressure to a race of the preloaded ball bearing of the first bearing stack.

20. The gas turbine engine of claim 14, wherein the bearing stack retainer applies pressure to a race of the ball bearing of the first bearing stack to provide pre-load for the first bearing stack.

* * * * *